(12) United States Patent
Kloiber et al.

(10) Patent No.: US 8,228,160 B2
(45) Date of Patent: Jul. 24, 2012

(54) SENSOR ELEMENT AND PROCESS FOR ASSEMBLING A SENSOR ELEMENT

(75) Inventors: Gerald Kloiber, Feldkirchen (AT); Norbert Freiberger, Graz (AT)

(73) Assignee: EPCOS AG, Munich (DE)

( * ) Notice: Subject to any disclaimer, the term of this patent is extended or adjusted under 35 U.S.C. 154(b) by 307 days.

(21) Appl. No.: 12/613,064

(22) Filed: Nov. 5, 2009

(65) Prior Publication Data
US 2010/0123543 A1 May 20, 2010

Related U.S. Application Data

(60) Provisional application No. 61/114,649, filed on Nov. 14, 2008.

(51) Int. Cl.
*H01C 7/10* (2006.01)
(52) U.S. Cl. .............. 338/22 R; 338/28; 338/7; 29/620; 29/610.1
(58) Field of Classification Search .............. 338/22 R, 338/25, 28, 7; 29/611–612, 620, 610.1
See application file for complete search history.

(56) References Cited

U.S. PATENT DOCUMENTS

| | | | | |
|---|---|---|---|---|
| 4,314,230 A | * | 2/1982 | Cardinal et al. | 338/314 |
| 4,321,577 A | * | 3/1982 | Carlson | 338/35 |
| 4,447,799 A | | 5/1984 | Carlson | |
| 4,818,363 A | * | 4/1989 | Bayha et al. | 204/426 |
| 5,142,266 A | * | 8/1992 | Friese et al. | 338/22 R |
| 5,410,291 A | * | 4/1995 | Kuzuoka | 338/22 R |
| 6,663,794 B2 | * | 12/2003 | Ogata et al. | 252/62.3 R |
| 6,766,574 B2 | * | 7/2004 | Mizoguchi et al. | 29/611 |
| 2009/0173526 A1 | | 7/2009 | Kloiber et al. | |

FOREIGN PATENT DOCUMENTS

| | | |
|---|---|---|
| DE | 102006031344 | 1/2008 |
| DE | 102008036837 | 2/2010 |
| JP | 57-187630 | 11/1982 |
| JP | 59-019827 | 2/1984 |
| JP | 10-149903 | 6/1998 |

OTHER PUBLICATIONS

International Search Report and Written Opinion in Application No. PCT/EP2009/064852, dated Feb. 23, 2010.
Datasheet, EPCOS AG, "NTC Thermistors for Temperature Measurement", Series / Type B57540 (G540), (Mar. 2006).
Datasheet, EPCOS AG, "NTC Thermistors for Temperature Measurement", Series / Type B57550 (G550), (Mar. 2006).
Datasheet, EPCOS AG, "NTC Thermistors for Temperature Measurement", Series / Type B57560 (G560), (Apr. 2008).
Datasheet, Heraeus Sensor Technology GmbH, "Platinum Resistance Temperature Detector", M213 (Oct. 2009).

* cited by examiner

*Primary Examiner* — Kyung Lee
(74) *Attorney, Agent, or Firm* — Fish & Richardson P.C.

(57) ABSTRACT

A high-temperature sensor element includes at least one thermistor element having at least two contact areas and one contacting element including an isolating ceramic base body and at least two conductor lines. The contact areas of the thermistor element are connected to the conductor lines of the contacting element by an electro conductive bridge. A process for assembling a sensor element is also described in which an thermistor element is connected by a temperature resistant junction to a contacting element, and in which the thermistor element and part of the contacting element adjacent to the thermistor element are sealed by a encapsulation compound.

15 Claims, 3 Drawing Sheets

SENSOR ELEMENT AND PROCESS FOR ASSEMBLING A SENSOR ELEMENT

This patent application claims the priority of U.S. patent application 61/114,649, filed Nov. 14, 2008, the disclosure content of which is hereby incorporated by reference.

TECHNICAL FIELD

This patent application relates to a high-temperature sensor element and a process of assembling such a sensor element.

BACKGROUND

High-temperature sensor elements are used in high temperature environments having temperatures between $T_{min}$ and $T_{max}$, where $T_{min}$ can be in the range from $-55°$ C. to about $+25°$ C., and where $T_{max}$ can be in the range from about $+300°$ C. to $+1000°$ C. High-temperature sensor elements should have the ability to measure the surrounding temperature highly accurately and as fast as possible. For the detection of the temperature, the sensor element should comprise a simple method for temperature detection like measurement of the resistance. High-temperature sensor elements have to exist in environments with high temperature for a long period of time without significant degeneration. High-temperature environments can be highly oxidizing by the presence of oxygen from the surrounding air. Thus, the sensor elements have to be built robust and hard-wearing together with low building costs.

SUMMARY

The high-temperature sensor element comprises at least one thermistor element, which can be a NTC element or a PTC element, the thermistor element having at least two contact areas. The abbreviation NTC stands for Negative Temperature Coefficient Thermistor. These are therefore sensor elements which, at least within a limited temperature interval, have a negative temperature coefficient of the electrical resistance. The abbreviation PTC stands for Positive Temperature Coefficient Thermistor. These are sensor elements which, at least within a limited temperature interval, have a positive temperature coefficient of the electrical resistance. Additionally to the embodiments described in the following with regard to thermistor elements which are formed as NTC elements, in further embodiments the NTC element can be replaced by a PTC element.

The sensor element comprises at least one contacting element comprising a preferably highly isolating ceramic base body and at least two conductor lines. The contact areas of the NTC element are connected to the conductor lines of the contacting element by electro-conductive bridges.

In an embodiment, the electro-conductive bridges comprise wire parts electrically connecting the contact areas of the NTC element to the conductor lines of the contacting element. The wire parts are preferably fixed on the contact areas of the NTC element and the conductor lines of the contacting element by a fired conductive compound or by a welding process or by a bonding process.

In an embodiment, the electro-conductive bridges comprise conductive compound electrically connecting the contact areas of the NTC element to the conductor lines of the contacting element.

In another embodiment, the contacting element comprises a ceramic base body formed as a panel or a slat. The ceramic of the base body is preferably based on aluminum oxide ($Al_2O_3$). The contacting element further comprises metallic conductor lines applied on the ceramic base body by a screen printing method.

In an embodiment, the NTC element and a part of the contacting element adjacent to the NTC element are hermetically sealed by a surrounding encapsulation compound.

In an embodiment, the encapsulation compound comprises ceramic and/or glass.

The material of the encapsulation compound preferably has no influence on the electric characteristics of the NTC element.

For the assembling of an above described sensor element, an NTC element is connected by a temperature resistant junction to a contacting element, where the NTC element and a part of the contacting element, adjacent to the NTC element are hermetically sealed by a surrounding encapsulation compound.

In an embodiment of the assembling process, the NTC element may temporarily be fixed to the contacting element by an electrically isolating and high-temperature resistant adhesive.

The temporarily fixed NTC element is then permanently connected to the contacting element in the region of the contact areas and conductor lines by electro-conductive bridges.

In an embodiment, the electro-conductive bridges are formed by a fired conductive compound.

In another embodiment, the electro-conductive bridges are formed by short wire parts which are fixed to the contact areas of the NTC element and the conductor lines of the contacting element. The short wire parts are fixed by a fired conductive compound or by a welding process or by a bonding process.

In another embodiment of the manufacturing process, the NTC element and a part of the contacting element adjacent to the NTC element are placed inside a glass tube. Afterwards, the glass tube is heated until collapsing of the glass tube to a surrounding encapsulation compound.

In another embodiment, the NTC element and a part of the contacting element adjacent to the NTC element are sealed by a ceramic material or by a glass material.

The NTC element of the sensor element may be in the form of a rectangular blade which comprises contacting areas on two opposite sides of the NTC element. To contact the NTC element, a contacting element is used which comprises a highly electrical isolating ceramic base body. On two opposite sides of the ceramic base body, the contacting element comprises electrically conductive conductor lines. The contact areas of the NTC element and the conductor lines of the contacting element on the ceramic base body are made by compounds of silver, silver platinum, gold or platinum. The material of the conductor lines can be different from the material of the contact areas of the NTC element. The metallic compounds are applied by a screen printing method on the ceramic base body of the contacting element and fired into the ceramic material.

The ceramic base body of the contacting elements may, for example, be made of an aluminum oxide ($Al_2O_3$) based ceramic. The connection between the NTC element and the connecting element is preferably applied on the metallic surface of the contacting element and the metallic surface of the NTC element.

In an embodiment, the connection may be applied by a short high-temperature stable metallic wire which electrically and mechanically connects the NTC element to the contacting element on the upper and lower surface of the NTC element. The connection from the metallic wire part to the metallic surface of the ceramic material may be applied by a conductive compound. The compound preferably has contact to the metallic surfaces of the contacting element and the NTC element and to the wire part in between. The compound is preferably fired to apply an electrically conductive connection between the wire part and the metallic surfaces of the contacting element and the NTC element.

In another embodiment, the wire part may, for example, be fixed to the metallic surface of the contacting element and the NTC element by a welding process or by a bonding process. High temperature stable wires comprise, for example, platinum, gold, nickel, iron-nickel compositions or alloys, a special steel sort like 2.4851, coated wires with a core of nickel which are coated, for example, by copper, silver, gold, platinum, coated wires with an iron-nickel core covered by nickel, copper, silver, gold or platinum.

In another embodiment, the electrically conductive connection between the contacting element and the NTC element can be applied by a conductive compound. The contacting element and the NTC element are placed face-to-face with a small amount of conductive compound applied as an electrically conductive bridge between the metallic surface of the contacting element and the NTC element. The conductive compound is preferably dried and fired into the metallic surfaces. The conductive compound can, for example, comprise silver, silver-platinum, gold or platinum compounds.

To advance the mechanical stability of the connection between the contacting element and the NTC element, a high temperature stable adhesive can be applied between the NTC element and the contacting element. Such an adhesive may, for example, be based on zirconium oxide or aluminum oxide.

To support the connection between the NTC element and the contacting element, the NTC element and adjacent part of the contacting element may be surrounded by a encapsulation compound. This encapsulation compound is preferably based on glass or ceramic based adhesives or other encapsulation compounds.

In an embodiment, the sensor element is sealed by a glass. The head of the sensor element can be placed inside a glass tube. The glass tube is heated until collapsing and provides a surrounding glass bulb to the NTC element and adjacent parts of the contacting element. The glass tube can be manufactured of melted glass or glass powder.

In another embodiment, it is possible to use glass slurry. The NTC element and adjacent parts of the contacting element are dipped or, alternatively, molded by the glass slurry. A following heating process leads to a solid surrounding glass encapsulation compound.

In another embodiment, the NTC element and the adjacent parts of the contacting element are dipped in a ceramic encapsulation compound or covered by a ceramic adhesive. A following heating process leads to a solid encapsulation with a solid cover.

The surrounded NTC element has to comprise a highly stabilized temperature characteristic in such a way that the electrical characteristic like the specific resistance and the so-called B value of the NTC element at the environmental temperature are not significantly shifted in time. The conductive surface of the NTC element preferably has no significant contact resistance to the ceramic body of the NTC element combined with a highly stable adhesive force of the conductive surface to the ceramic body. The conductive surface of the NTC element is preferably stable to high-temperatures in case of being covered by encapsulation compounds.

The contacting element preferably comprises a sufficiently high resistance in the upper region of the environmental temperature.

The NTC element and the contacting element are preferably connected in parallel to each other. In order to not distort the signal of the temperature-sensitive NTC element, the resistance of the components of the sensor element has to comply in the range between the minimum and the maximum temperature. The resistance of the contacting element is preferably greater than the resistance of the NTC element at the range between the minimum and the maximum temperature.

Preferably, the electrically conductive surface of the contacting element may be stable in oxidizing environments like oxygen of the air. During firing of the conductive compound for the electrically conductive bridge or during sealing of the sensor head, temperatures higher than the maximum temperature of the sensor head can be reached.

The conductive surface of the contacting element is preferably high temperature stable in order to cope with possible damaging influences of the aforementioned process. Furthermore, the conductive surface of the contacting element preferably comprises a mechanically highly stable adhesion to the ceramic base body of the contacting element.

The resistance of the conductive surface of the contacting element may have a low resistance according to the resistance of the NTC element for the complete range of temperature. Preferably, the thermal expansion coefficient of the contacting element has to be adjusted to the encapsulation compound of the sensor element in order to avoid the appearance of cracks due to temperature changes. The electrically conductive bridge is preferably at least in a covered state stable to high temperatures.

The material of the encapsulation compound is in case of a glass compound preferably stable to high temperatures. The transformation temperature of the glass is preferably higher than the maximum temperature of the sensor element.

Preferably, the thermal expansion coefficient of the encapsulation compound is adjusted to the thermal expansion coefficient of the NTC element and the contacting element of the sensor element in order to avoid mechanical damages.

In order to not influence the signal of the temperature-sensitive NTC element, the encapsulation compound preferably has a resistance which is at least in the range between $T_{min}$ and $T_{max}$ greater than the resistance of the NTC element.

In contrast to known sensor elements, the aforementioned sensor element has a simple and robust configuration in common with a high sensitivity for gathering the environmental temperature. Due to its simple design, the above-mentioned sensor element can, according to other sensor elements, be build quite cheaply.

Features of the sensor element are shown in more detail with the following detailed description in conjunction with the accompanying drawings.

DETAILED DESCRIPTION

In FIGS. 1 to 6 an NTC element 1 is shown as thermistor element. Alternatively to the embodiments described in the following, a PTC element can be used instead of the NTC element 1 shown in FIGS. 1 to 6.

Figure 1:
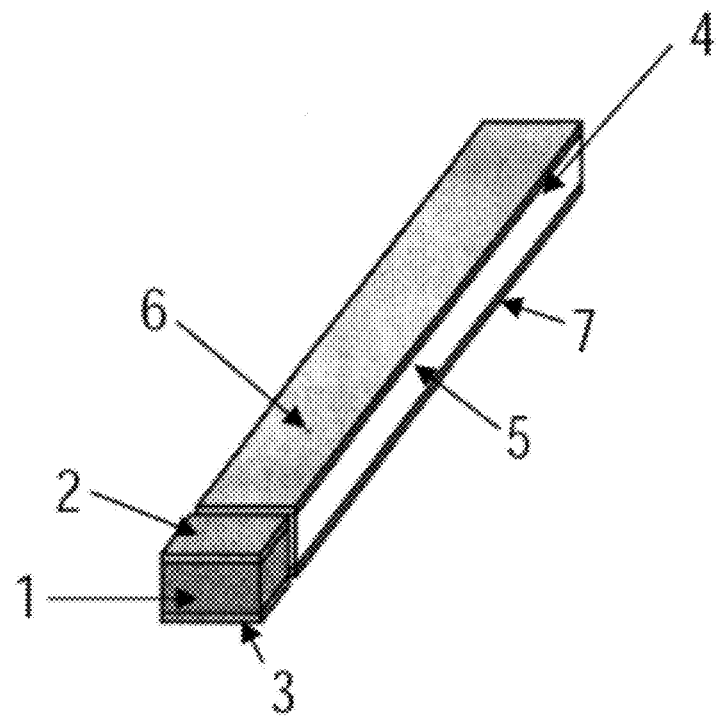
FIG. 1 is a view of the base of an NTC element and a contacting element in order to show the configuration of these parts.

FIG. 1 is a perspective view of a relative configuration of the NTC element 1 and of the contacting element 4. The NTC element 1 shown in FIG. 1 has a rectangular form. In another embodiment, it is also possible that the NTC element comprises other geometric forms like blades or anything else. The contacting element 4 is shown as a rectangular rod shaped part. The form of the contacting element 4 can also be varied. The thickness and the width of the NTC element 1 and the contacting element 4 do not have to be adjusted to each other. Between the NTC element 1 and the contacting element, a gap can be present. In an embodiment, there can also be no gap between the NTC element 1 and the contacting element 4.

In another embodiment, the gap between the NTC element 1 and the contacting element 4 may be filled by a high temperature stable adhesive to connect the NTC element 1 with the contacting element 4. In such a case, the adhesive would be placed in the gap between the NTC element 1 and the contacting element 4. The NTC element 1 has contact areas 2, 3 on its upper and lower surfaces. The contacting element 4 comprises a ceramic base body 5 and metallic conductor lines 6, 7 on its upper and lower surface.

Figure 2:
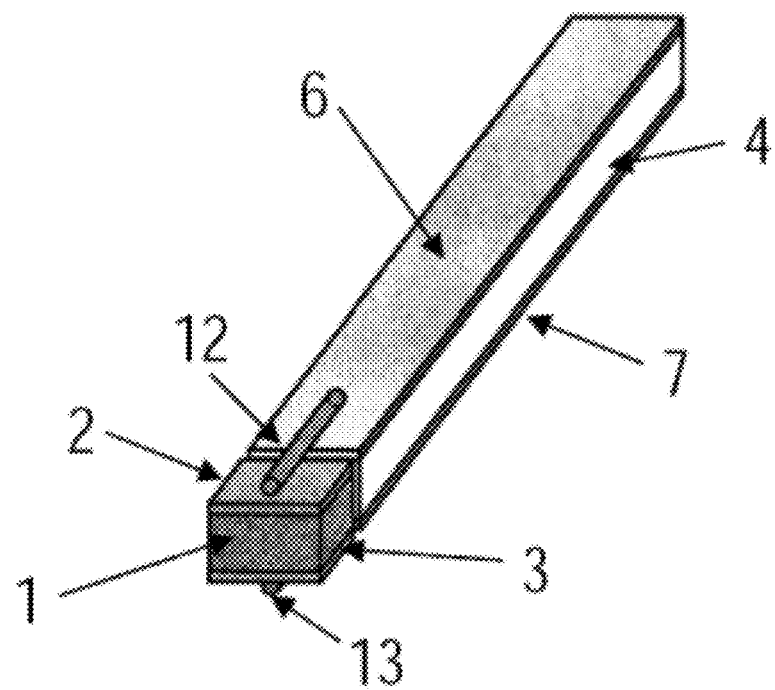
FIG. 2 is a view similar to FIG. 1 where the wire parts are placed on the NTC element and the contacting element.

In FIG. 2, the configuration of short wire parts 12, 13 are shown. The short wire parts 12, 13 apply an electrically conductive bridge between the NTC element 1 and the contacting element 4. Preferably, the wire parts 12, 13 are placed on the contact areas 2, 3 of the NTC element 1 and the conductor lines 6, 7 of the metallic conductive surface of the contacting element 4.

Figure 3:
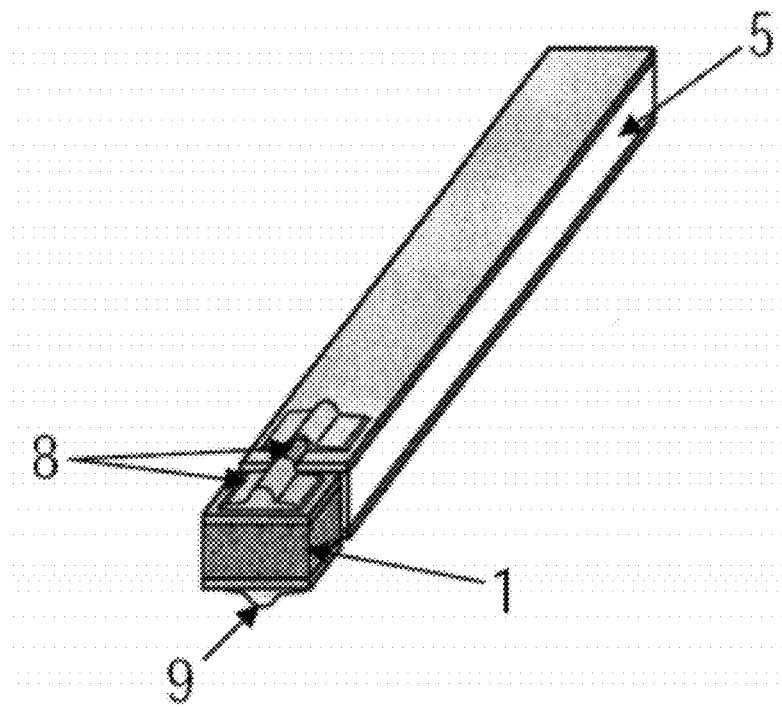
FIG. 3 is a view of another embodiment of the sensor element where the wire parts are fixed by an electrically conductive compound.

In FIG. 3, the connection of the wire parts to the NTC element 1 and the contacting element 4 is shown. The embodiment shown in FIG. 3 shows a connection by short wired part 12, 13 and an electrically conductive compound which is dried and fired into the metallic surface of the NTC element 1 and the metallic surface of the contacting element 4. The wire parts 12, 13 and the electrically conductive compound form electro-conductive bridges 8, 9 between the NTC element 1 and the contacting element 4. In an alternative embodiment, the wire parts 12, 13 can be fixed by a welding or bonding process to the NTC element 1 and the contacting element 4.

Figure 4:
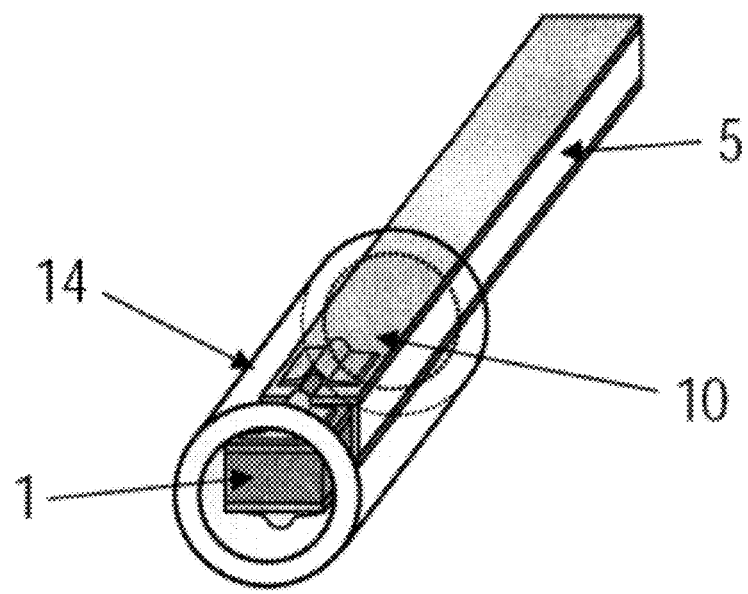
FIG. 4 is a view similar to FIG. 3 where the NTC element and adjacent parts of the contacting element are placed inside a glass tube.
Figure 5:
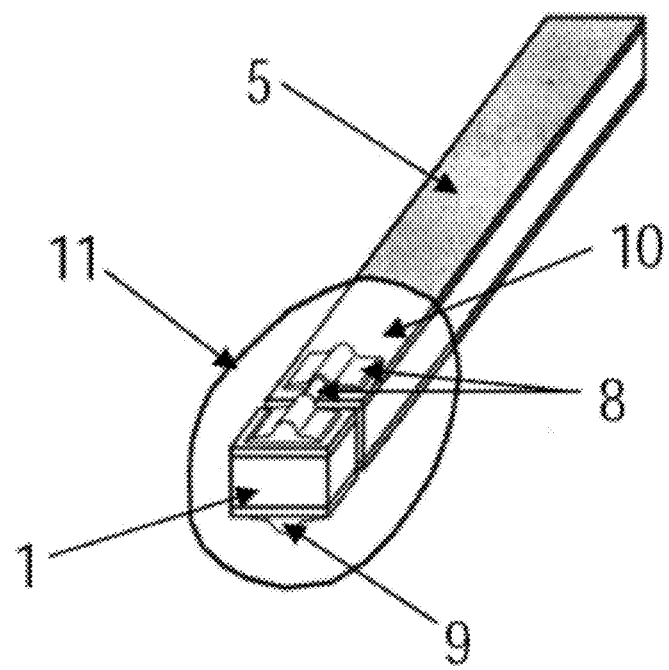
FIG. 5 is a view of a sensor element of FIG. 4 where the glass tube is heated and forms a glass bulb.

FIG. 4 shows an embodiment of the sensor element, in which the NTC element 1 and adjacent parts 10 of the contacting element 4 are placed inside a glass tube 14. The glass tube 14 is shifted over the NTC element 1 and adjacent parts 10 of the contacting element 4. Afterwards, the glass tube 14 is heated in such a way that the glass tube 14 is collapsing in order to form a sealing 11 around the NTC element 1 and adjacent parts 10 of the contacting element 4, which is shown in FIG. 5. In an alternative embodiment, the NTC element 1 and adjacent parts 10 of the contacting element 4 can be dipped in a glass lurk or be molded by glass. In a following heating process, the glass lurk forms a solid sealing 11 around the NTC element 1 and adjacent parts 10 of the contacting element 4. In an alternative embodiment, a ceramic based encapsulation compound or a ceramic adhesive can be used. After a hardening step, the ceramic forms a solid encapsulation compound 11 around the head of the sensor element.

Figure 6:
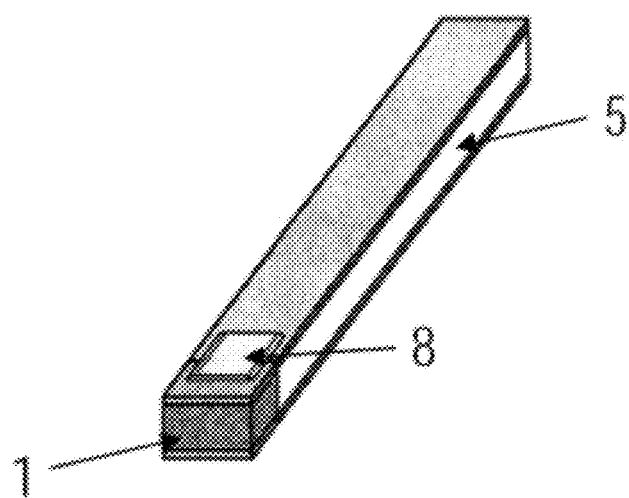
FIG. 6 is a view of another embodiment of the sensor element where the NTC element and the contacting element are connected to each other by a fired conductive compound.

FIG. 6 shows an alternative embodiment of the sensor element in which the electro-conductive bridge 8 between the metallic surface of the NTC element 1 and the metallic surface of the contacting element 4 is applied by an electro-conductive compound which is fired into the metallic surfaces of the NTC element 1 and the contacting element 4.

The embodiments described in FIG. 1 to FIG. 6 can preferably be applied for measuring high temperatures.

What is claimed is:

1. A high temperature sensor element comprising:
    a thermistor element comprising at least two contact areas, wherein the thermistor element is an NCT element or a PTC element;
    a contacting element comprising an isolating ceramic base body and at least two conductor lines; and
    electro-conductive bridges connecting contact areas of the thermistor element corresponding conductor lines of the contacting element;
    wherein the isolating ceramic body has a lower surface and an upper surface; and
    wherein one of the at least two conductor lines is on the lower surface and one of the at least two conductor lines is on the upper surface.

2. The sensor element according to claim wherein the thermistor element and a part of the contacting element adjacent to the thermistor element are sealed by an encapsulation compound.

3. The sensor element according to claim 1, wherein an electro conductive bridge comprises wire parts for electrically connecting a contact area of the thermistor element to a conductor line of the contacting element.

4. The sensor element according to claim 3, wherein the wire parts are fixed on the contact area and the conductor line by a fired conductive compound, by a welding process, or by bonding.

5. The sensor element according to claim 1, wherein each electro-conductive bridge comprises a conductive compound connecting a contact area of the thermistor element to a conductor line of the contacting element.

6. The sensor element according to claim 1, wherein the contacting element comprises a ceramic base body comprising a panel or a slat based on $Al_2O_3$, and wherein the at least two conductor lines comprise screen-printed conductor lines on the ceramic base body.

7. The sensor element according to claim 2, wherein the encapsulation compound comprises ceramic and/or glass.

8. The sensor element according to claim 2, wherein the encapsulation compound has no influence on electrical characteristics of the thermistor element.

9. A process for assembling a the high temperature sensor element of claims 1 to 8 comprising:
    connecting the thermistor element to the contacting element via a temperature-resistant junction; and
    sealing the thermistor element and a neighboring part of the contacting element using encapsulation compound.

10. The process of 9, further comprises temporarily fixing the thermistor element to the contacting element using an electrically-isolating, high-temperature resistant adhesive.

11. The process of claim 10, further comprising permanently connecting the thermistor element to the at least two conductor lines of the contacting element via the electro-conductive bridges.

12. The process of claim 11, wherein the electro-conductive bridges are formed by a fired conductive compound.

13. The process of claim 9, wherein the electro-conductive bridges are formed by short wire parts that are fixed to corresponding contact areas of the thermistor element and the conductor lines of the contacting element by a fired conductive compound, by a welding process, or by a bonding process.

14. The process of claim 9, further comprising forming the encapsulation compound by placing the thermistor element and an adjacent part of the contacting element in a glass tube and melting the glass tube.

15. The process of claim 9, wherein the thermistor element and an adjacent part of the contacting element are sealed by a ceramic material.

\* \* \* \* \*

UNITED STATES PATENT AND TRADEMARK OFFICE
CERTIFICATE OF CORRECTION

| | | |
|---|---|---|
| PATENT NO. | : 8,228,160 B2 | Page 1 of 1 |
| APPLICATION NO. | : 12/613064 | |
| DATED | : July 24, 2012 | |
| INVENTOR(S) | : Gerald Kloiber and Norbert Freiberger | |

It is certified that error appears in the above-identified patent and that said Letters Patent is hereby corrected as shown below:

First Page, Col. 2, Abstract, Line 6:
Delete "electro conductive" and Insert -- electro-conductive --

Column 6, Claim 1, Line 14:
After "element" Insert -- to --

Column 6, Claim 2, Line 21:
After "claim" Insert -- 1, --

Column 6, Claim 3, Line 26:
In Claim 3, delete "electro conductive" and Insert -- electro-conductive --

Column 6, Claim 9, Line 47:
Before "the" delete "a"

Column 6, Claim 9, Line 48:
Delete "clement" and Insert -- element --

Column 6, Claim 10, Line 53:
After "of" Insert -- claim --

Signed and Sealed this
Fourth Day of December, 2012

David J. Kappos
*Director of the United States Patent and Trademark Office*